(12) United States Patent
Huang et al.

(10) Patent No.: US 7,798,224 B2
(45) Date of Patent: Sep. 21, 2010

(54) RHEOLOGY CONTROLLED HETEROGENEOUS PARTICLE PLACEMENT IN HYDRAULIC FRACTURING

(75) Inventors: Haiying Huang, Missouri City, TX (US); Joseph A. Ayoub, Katy, TX (US); Philip F. Sullivan, Bellaire, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 52 days.

(21) Appl. No.: 11/769,009

(22) Filed: Jun. 27, 2007

(65) Prior Publication Data

US 2008/0182762 A1 Jul. 31, 2008

Related U.S. Application Data

(60) Provisional application No. 60/818,432, filed on Jul. 3, 2006.

(51) Int. Cl.
*E21B 43/267* (2006.01)
*E21B 47/00* (2006.01)

(52) U.S. Cl. ............... 166/280.1; 166/305.1; 166/308.1; 166/250.1

(58) Field of Classification Search ........................ None
See application file for complete search history.

(56) References Cited

U.S. PATENT DOCUMENTS

| 3,637,014 | A | * | 1/1972 | Jones | ........................ | 166/268 |
|---|---|---|---|---|---|---|
| 3,692,676 | A | | 9/1972 | Cutter et al. | | |
| 4,321,968 | A | * | 3/1982 | Clear | ........................ | 166/275 |
| 4,848,467 | A | | 7/1989 | Cantu et al. | | |
| 4,957,165 | A | | 9/1990 | Cantu et al. | | |
| 4,986,355 | A | | 1/1991 | Casad et al. | | |
| 5,062,969 | A | * | 11/1991 | Holtmyer et al. | ............ | 507/222 |
| 5,551,516 | A | | 9/1996 | Norman et al. | | |
| 5,964,295 | A | | 10/1999 | Brown et al. | | |
| 5,989,336 | A | * | 11/1999 | Carpenter et al. | ........... | 106/811 |
| 6,435,277 | B1 | | 8/2002 | Qu et al. | | |

(Continued)

OTHER PUBLICATIONS

Kirk et al.; "Nuts"; Encyclopedia of Chemical Technology, 1981, pp. 248-276; 3rd Edition, vol. 16; Wiley-Interscience Publication, John Wiley & Sons; New York City, U.S.A.

(Continued)

*Primary Examiner*—Zakiya W Bates
*Assistant Examiner*—Angela M DiTrani
(74) *Attorney, Agent, or Firm*—Rachel Greene; David Cate; Robin Nava

(57) ABSTRACT

A method of treating a subterranean formation penetrated by a wellbore includes preparing a treatment fluid with shear thinning, non-monotonic rheological properties, injecting the treatment fluid into the subterranean formation, and inducing shear rate softening phase transition in the treatment fluid. The non-monotonic rheology properties can be such that in the relationship between shear stress ($\sigma$) versus strain rate ($\dot{\gamma}$), where $\dot{\gamma}_1 < \dot{\gamma}_2 < \dot{\gamma}_3 < \dot{\gamma}_4$, the shear stress values are $\sigma_1 < \sigma_2 \sigma_3 \leq \sigma_4$, and $\sigma_3 < \sigma_2$. The method can heterogeneously deposit proppant or solid acid in a fracture. A system to fracture a subterranean formation includes the fracturing fluid, a wellbore to inject the fracturing fluid to propagate a fracture in the formation, and a rate controller to inject the fracturing fluid into the subterranean formation at a minimum volumetric rate to provide a shear stress at an inlet to the fracture that exceeds $\sigma_2$. The method and system can achieve heterogeneous particle placement with either proppant or solid acid.

20 Claims, 4 Drawing Sheets

U.S. PATENT DOCUMENTS

| | | | |
|---|---|---|---|
| 6,703,352 | B2 | 3/2004 | Dahayanake et al. |
| 6,795,773 | B2 * | 9/2004 | Soliman et al. .......... 702/6 |
| 2002/0004464 | A1 | 1/2002 | Nelson et al. |
| 2002/0169085 | A1 | 11/2002 | Miller et al. |

OTHER PUBLICATIONS

"Oilfield Applications"; Encyclopedia of Polymer Science and Engineering; 1987; pp. 328-369; vol. 10 Molecular Weight Determination to Pentadiene Polymers; Wiley-Interscience Publication, John Wiley & Sons; New York City; U.S.A.

John W. Ely; "Monitoring Fracturing Fluids"; Stimulation Engineering Handbook; 1994; pp. 79-96-Chapter 6; PennWell Books, PenWell Publishing Company; Tulsa Oklahoma; U.S.A.

Daniel Bonn and Jacques Meunier; Olivier Greffier, Amer Al-Kahwaji and Hamid Kellay "Bistability in non-Newtonian flow; Rheology of lyotropic liquid crystals"; Physical Review E; Aug. 1998; pp. 339-345; vol. 58, No. 2; The American Physical Society.

John Bergenholtz and Norman J. Wagner; "Formation of AOT/Brine Multilamellar Vesicles"; American Chemical Society; 1996; pp. 3122-3126.

P.D. Olmsted; "Two-state shear diagrams for complex fluids in shear flow"; pp. 339-345; Europhysics Letters 48 (3).

* cited by examiner

RHEOLOGY CONTROLLED HETEROGENEOUS PARTICLE PLACEMENT IN HYDRAULIC FRACTURING

CROSS REFERENCE TO RELATED APPLICATION

This application is entitled to the benefit of provisional patent application U.S. Ser. No. 60/818,432, filed Jul. 3, 2006.

BACKGROUND OF THE INVENTION

The statements in this section merely provide background information related to the present disclosure and may not constitute prior art.

This invention relates to methods for treating subterranean formations using proppants and other solid materials, and in particular, methods and systems for fracturing subterranean formations penetrated by a wellbore using fluids with rheology properties which help achieve layered particle structures to form highly conductive fluid paths in the fracture.

Hydrocarbon producing subterranean formations penetrated by wellbores are often treated by fracturing the subterranean formation and depositing proppant particle packs or other solids in the fractures. In fracturing operations, solid particles are suspended in water or a viscous fluid at the surface and carried to a fracture in the wellbore in which they are to be placed at a designed concentration and pump rate. After the proppant is placed, the carrier fluid is returned to the surface via the washpipe, or some of the fluid is leaked off into the formation during the treatment. The propped fracture produced functions to keep the fracture open.

Two common problems often experienced as a result of fracturing subterranean formations are difficulties in the clean-up of the fracturing fluid and low retained conductivity. In the first case, the clean-up of the fracturing fluid can be partially inhibited as the placed particles have the tendency to retain fluid components, such as viscosifiers. In the later case, the pathways for production of formation fluids can be blocked by trapped fluid components and/or a substantially homogeneous distributed proppant layer filling the fracture.

There have been attempts in the art to place particles heterogeneously in hydraulic fracturing to create higher fracture conductivity than uniform particle placement. Currently, there is no established method to reliably achieve a productive heterogeneous placement, i.e., a placement that reliably succeeds in creating more productive fracture treatments by ensuring clear paths along substantially the total length of the fracture.

The need exists in fracturing operations for reliable heterogeneous particle placement methods and systems which provide improved clean-up and retained conductivity after treatment.

SUMMARY OF THE INVENTION

This invention relates to methods for treating subterranean formations using proppants and other solid materials, and in particular, methods of treating subterranean formations penetrated by a wellbore using fluids with rheology properties which help achieve layered particle structures to form highly conductive fluid paths, for example, between plurality layered solid particle structures in the case of proppants placed in the fracture, or between ridges and valleys etched in the fracture surface in the case of solid acid.

The use of fluids with non-monotonic rheology properties can allow treatment designs that achieve layered structures with substantially clean fluid paths through the layers of particles. The layered structures of particles and paths, after fracture closure for example, can result in highly permeable channels that give improved clean-up and retained conductivity, thus boosting formation fluid production. This type of heterogeneous particle placement can be achieved with surfactant or polymer fluid systems if the fluid rheology shows non-monotonic behavior, namely, a region where the shear stress decreases with increasing shear rate in the flow curve.

Embodiments of the invention relate to methods and systems for treating subterranean formations using proppants and other solid materials. When applied to the treatment of subterranean formations penetrated by a wellbore, fluids with shear thinning non-monotonic rheology properties can aid in obtaining layered particle structures with highly conductive fluid paths between plurality-layered solid particle structures. If solid acid particles are used instead of proppant in another embodiment, preferential etching of the fracture surface can produce ridges and valleys to provide the highly conductive fluid paths corresponding to the valleys.

In one aspect, the present invention provides a method of treating a subterranean formation penetrated by a wellbore. The method can include preparing a treatment fluid with shear thinning, non-monotonic rheological properties, injecting the treatment fluid into the subterranean formation and inducing shear rate softening phase transition in the treatment fluid.

In an embodiment, the non-monotonic rheological properties comprise a shear rate softening relationship between shear stress ($\sigma$) versus strain rate ($\dot{\gamma}$) wherein for $\dot{\gamma}_1 < \dot{\gamma}_2 < \dot{\gamma}_3 < \dot{\gamma}_4$, corresponding values of shear stress are $\sigma_1 < \sigma_2$, $\sigma_2 > \sigma_3$, and $\sigma_3 \leq \sigma_4$, wherein $\dot{\gamma}_1$, $\sigma_1$ represent a region of low shear rate dominance, $\dot{\gamma}_4$, $\sigma_4$ represent a region of high shear rate dominance and $\dot{\gamma}_2$, $\sigma_2$ and $\dot{\gamma}_3$, $\sigma_3$ represent a shear rate softening transition region.

In an embodiment, the treatment fluid can be a slurry of entrained particles distributed during the phase transition into a layered structure comprising particle-rich layers alternated with particle-lean layers. The method can include fracturing the subterranean formation and maintaining the layered structure in a fracture after closure of the fracture to form permeable channels in the fracture. In an embodiment, the particles comprise proppant and the permeable channels are formed in a proppant pack. In another embodiment, the particles comprise solid acid and the permeable channels are formed by etching ridges and valleys in a surface of the fracture.

In an embodiment, the injection can be at a pumping rate at an inlet to the fracture to provide a shear stress at the inlet that exceeds a minimum critical shear rate in a region of high shear rate dominance adjacent a shear rate softening transition region. Propagation of the fracture can be an unloading process wherein shear stress at a fixed point decreases with time.

In another embodiment, the injection can have a minimum pumping rate at an inlet to a fracture in the formation to provide a shear stress at the inlet that exceeds $\sigma_2$ as defined above. The method can include, in one embodiment, developing a pumping schedule using a fracturing simulator to maintain at least the minimum pumping rate during the injection, and pumping the fracturing fluid into the wellbore according to the schedule. The pumping schedule can be revised during the injection and the fracturing fluid then pumped according to the revised schedule.

In one preferred embodiment, the present invention provides a method that can include developing a pumping schedule for injection of a fracturing fluid with shear thinning, non-monotonic rheological properties at a pumping rate to propagate a fracture in the subterranean formation and to induce shear rate softening phase transition in the fracturing fluid during the propagation of the fracture. The non-monotonic rheological properties can comprise a shear rate softening relationship between shear stress ($\sigma$) versus strain rate ($\dot{\gamma}$) wherein for $\dot{\gamma}_1 < \dot{\gamma}_2 < \dot{\gamma}_3 < \dot{\gamma}_4$, corresponding values of shear stress are $\sigma_1 < \sigma_2$, $\sigma_2 > \sigma_3$, and $\sigma_3 \leq \sigma_4$, wherein $\dot{\gamma}_1$, $\sigma_1$ represent a region of low shear rate dominance, $\dot{\gamma}_4$, $\sigma_4$ represent a region of high shear rate dominance and $\dot{\gamma}_2$, $\sigma_2$ and $\dot{\gamma}_3$, $\sigma_3$ represent a shear rate softening transition region. The injection can include a minimum pumping rate at an inlet to a fracture in the formation to provide a shear stress at the inlet that exceeds $\sigma_2$, and injecting the fracturing fluid via the wellbore and the inlet into the subterranean formation. The fracturing fluid can include a slurry of entrained particles distributed during the phase transition into a layered structure comprising particle-rich layers alternated with particle-lean layers. The method can further include stopping the pumping and allowing the fracture to close, and maintaining the layered structure after fracture closure to form permeable channels in the fracture. The particles can be proppant and the permeable channels can be formed in a proppant pack, or alternatively or additionally, the particles can be solid acid and the permeable channels formed by etching ridges and valleys in a surface of the fracture. If desired, the method can include developing the pumping schedule using a fracturing simulator, and optionally revising the pumping schedule during the injection and pumping the fracturing fluid according to the revised schedule.

In another aspect the invention provides a system to fracture a subterranean formation. The system can have a fracturing fluid with shear thinning, non-monotonic rheological properties and comprising a slurry of particles in an aqueous medium with a viscosifying agent, wherein the non-monotonic rheological properties comprise a shear rate softening relationship between shear stress ($\sigma$) versus strain rate ($\dot{\gamma}$) wherein for $\dot{\gamma}_1 < \dot{\gamma}_2 < \dot{\gamma}_3 < \dot{\gamma}_4$, corresponding values of shear stress are $\sigma_1 < \sigma_2$, $\sigma_2 > \sigma_3$, and $\sigma_3 \leq \sigma_4$, wherein $\dot{\gamma}_1$, $\sigma_1$ represent a region of low shear rate dominance, $\dot{\gamma}_4$, $\sigma_4$ represent a region of high shear rate dominance and $\dot{\gamma}_2$, $\sigma_2$ and $\dot{\gamma}_3$, $\sigma_3$ represent a shear rate softening transition region. The system can also include a wellbore penetrating and in fluid communication with the formation to inject the fracturing fluid to propagate a fracture in the formation, and a rate controller to inject the fracturing fluid into the subterranean formation at a minimum volumetric rate to provide a shear stress at an inlet to the fracture that exceeds $\sigma_2$.

In embodiments of the method or system, the particles can be proppant, solid acid, or the like. The aqueous medium can be a brine, for example, of potassium chloride, sodium formate, potassium formate, calcium chloride, calcium bromide, or the like, or a combination thereof. The viscosifying agent can include from 0.5% to 15% by weight of the fluid of a viscoelastic surfactant (VES), based on the total fluid weight at injection. One embodiment of a VES is erucyl bis-(2-hydroxyethyl) methyl ammonium chloride.

In another embodiment, the viscosifying agent can include from about 0.10% to about 0.60% by weight of the fluid of a polymer, based on the total fluid weight at injection. Embodiments of the polymer include guar, hydroxypropyl guar (HPG), carboxymethyl guar (CMG), carboxymethylhydroxypropyl guar (CMHPG), hydroxyethylcellulose (HEC), hydroxypropylcellulose (HPC), carboxymethylhydroxyethylcellulose (CMHEC), xanthan, diutan, scleroglucan, polyacrylamide polymers, polyacrylate polymers, and the like, or any mixtures thereof.

DETAILED DESCRIPTION

Figure 1:
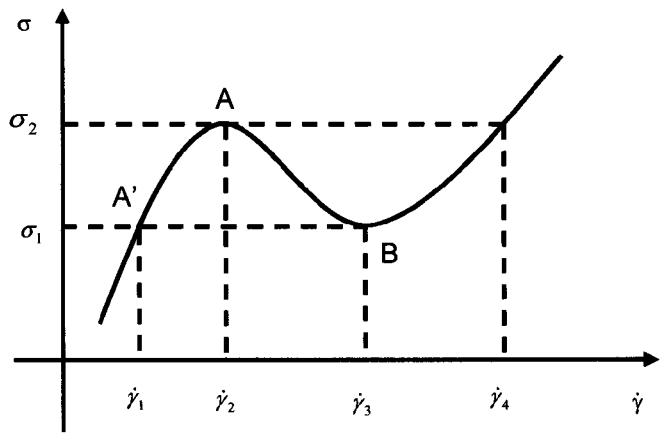
FIG. 1 schematically illustrates the stress-strain flow curve for a general non-monotonic shear thinning fluid rheology according to an embodiment of the invention.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

As used herein, the terms "highly conductive" fluid paths, "highly permeable" streaks and the like refer to fluid paths which are substantially free of obstruction by proppant or other flow-impeding structures and thus have a hydraulic conductivity which is orders of magnitude higher than that of typical interstitial flow passages through a proppant matrix.

In an embodiment, the invention provides a method for designing a treatment fluid with shear thinning non-monotonic rheology properties, preparing the fluid, and treating a subterranean formation penetrated by a wellbore by injecting the fluid into the wellbore under rheological conditions to induce shear thinning phase transition.

In one embodiment, the method can be used to induce fractures in a formation. Techniques for hydraulically fracturing a subterranean formation involve pumping the fracturing fluid into a borehole and out into a surrounding formation. A fluid pressure is above a minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein.

In many cases, hydraulic fracturing includes pumping a proppant-free viscous fluid, or pad stage, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depend on the type of viscosifying agent added. The use of the aqueous energized fluids according to embodiments can diminish the single dominance of the viscosifying agent on proppant suspension and transport ability, as well as improve proppant suspension and transport ability at elevated temperatures in excess of about 93° C., and particularly at temperatures in excess of about 121° C.

One embodiment of a rheological property of treatment fluids employed in the present invention is a non-monotonic shear thinning behavior, also called shear rate softening, in a flow curve expressed in terms of shear stress versus shear strain rate. FIG. 1 schematically illustrates the stress-strain flow curve for a general non-monotonic shear thinning fluid rheology according to an embodiment of the invention. A fluid with rheology that shows non-monotonic behavior can be used to obtain heterogeneous particle placement in treatment methods such as hydraulic fracturing with, for example, proppants or solid acid. Heterogeneous placement can create clear paths for fluid flow and can thus provide higher fracture conductivity than uniform particle placement.

With reference to FIG. 1, the shear thinning, non-monotonic rheological properties can result in a shear rate softening relationship between shear stress ($\sigma$) versus strain rate ($\dot{\gamma}$). For increasing strain rate, i.e., $\dot{\gamma}_1 < \dot{\gamma}_2 < \dot{\gamma}_3 < \dot{\gamma}_4$ shown in FIG. 1, the corresponding values of shear stress are related as follows: $\sigma_1 < \sigma_2$, $\sigma_2 > \sigma_3$, and $\sigma_3 \leqq \sigma_4$. In FIG. 1, point A' ($\dot{\gamma}_1$, $\sigma_1$) on the flow curve represents a region of low shear rate dominance; the point corresponding to ($\dot{\gamma}_4$, $\sigma_4$) a region of high shear rate dominance; and the points on the flow curve between A ($\dot{\gamma}_2$, $\sigma_2$) and B ($\dot{\gamma}_3$, $\sigma_3$) represent a shear rate softening transition region. As used herein, the region of low shear rate dominance or low shear rheology refers to any point on the flow curve to the left of point A ($\dot{\gamma}_2$, $\sigma_2$); and the region of high shear rate dominance or high shear rheology to any point on the flow curve to the right of point B ($\dot{\gamma}_3$, $\sigma_3$).

Figure 2:
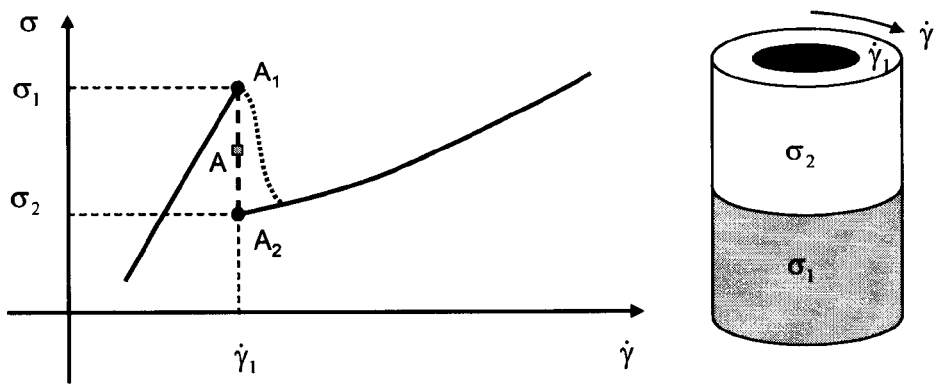
FIG. 2 illustrates an extreme schematic of shear thinning non-monotonic rheology and a possible scenario of shear induced phase transition, wherein the dashed line denotes the two phase region if the width of the biphasic region is 0, and the dotted line denotes the two phase region when the width of the biphasic region is greater than 0 according to an embodiment of the invention.
Figure 3:
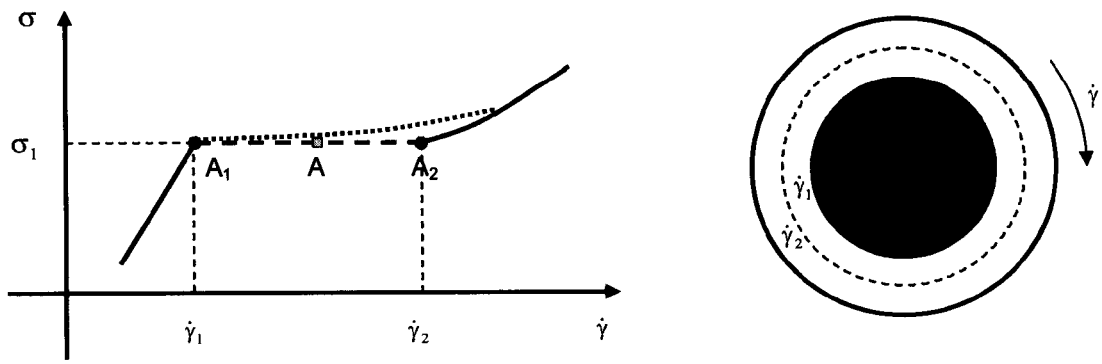
FIG. 3 illustrates a schematic of shear thinning rheology showing a constant stress plateau and the corresponding scenario of shear induced phase transition, wherein the dashed line denotes the two phase region if the width of the biphasic region is 0, and the dotted line denotes the two phase region when the width of the biphasic region is greater than 0 according to an embodiment of the invention.

Some embodiments use fluids with specific rheology properties allowing treatment designs that can aid in the formation of layered structures with substantially clean fluid paths between particle laden layers. After fracture closure, the layered structures of particles and paths can result in highly permeable channels. This type of heterogeneous particle placement can be achieved with surfactant or polymer fluid systems if the fluid rheology shows the shear stress decreases with increasing shear rate in the flow curve, as shown in FIGS. 1 through 3. Although not bound to any particular theory of operation, the specific fluid rheology can lead to shear-induced structures, for example multiple phases, with particles being transported in the less ordered ones.

Slot flow testing of potential fluid systems and slurries can be helpful to predict the behavior of the system in fracturing treatments. This is because flow during a hydraulic fracturing treatment resembles that in the slot because in most cases, the length of the fracture is much larger than the height of the fracture and the height much larger than the width. Similar information can also be obtained from Couette cell testing.

If layered structures result from the use of a shear thinning rheology, and these can be maintained after the closure of the fracture, there can be two potential benefits. First, in the application of hydraulic fracturing with proppants, with these layered structures, there can be highly permeable streaks in the proppant pack and, therefore, an increase in the fracture conductivity by orders of magnitude. Second, in the application of acid fracturing with solid acid, if solid acid particles form layers during the transport process, the etching of the fracture surface can form ridges and valleys. If the reservoir rock is strong enough to prevent failure from crushing due to fracture closure, i.e., if the ridges and valleys can be essentially maintained, then the fracture can be much more conductive.

Shear-induced phase transition in shear thinning fluids includes two types of fundamental rheology signatures: a stress jump at a constant rate and a shear rate jump at a constant stress. FIG. 2 shows an extreme schematic of the shear thinning non-monotonic rheology and a possible scenario of shear induced phase transition, wherein $\sigma$ and $\dot{\gamma}$ denote the shear stress and strain rate, respectively. The dashed line denotes the two phase region if the width of the biphasic region $\delta\phi=0$, and the dotted line denotes the two phase region when $\delta\phi>0$, wherein $\delta\phi$ is the thickness of the interface between state $A_1$ and $A_2$.

The non-monotonic shear thinning rheology, as shown in FIG. 2, is responsible for forming the layered structure in the height direction of a Couette cell. The stress jump from $\sigma_1$ to $\sigma_2$ at a constant rate $\gamma_1$ means that the fluid would not be stable at any stress state between $\sigma_1$ and $\sigma_2$ ($\sigma_1<\sigma<\sigma_2$). In other words, the fluid would not remain in a state identified by point A in FIG. 1. Instead, the only states that are thermodynamically admissible are $A_1$ and $A_2$. As a result, shear induced phase transition would occur so as to satisfy the mechanical equilibrium in an average sense. For the slot flow or Couette configuration, the transition would occur along the height direction, and multiple bands with periodic arrangement are possible. The thickness of each phase can be more or less constant and characteristic of the fluid chemistry.

Another scenario of shear induced phase transition in shear thinning fluids can be associated with the flow curve exhibiting a flat stress plateau. In FIG. 3, a schematic of a shear thinning rheology shows a constant stress plateau and the corresponding scenario of shear induced phase transition, wherein $\sigma$ and $\gamma$ denote the shear stress and strain rate, respectively. The dashed line denotes the two phase region if the width of the biphasic region $\delta\phi=0$, and the dotted line denotes the two phase region when $\delta\phi>0$. The fluid is unstable in any state (identified by point A) if the imposed shear rate falls between $\gamma_1$ and $\gamma_2$. Instead, the fluid can remain in states $A_1$ and $A_2$ and shear induced phase transition can occur in the shear plane to form a two-band structure. In this case, however, the shear induced structure can be fully determined by static equilibrium.

The jumps in the stress and the rate shown in FIGS. 2 and 3 are generally idealized. These extreme cases, denoted by the dashed lines, correspond to the situations where the thickness of the interface $\delta\phi$ between state $A_1$ and $A_2$ is zero. In reality, diffusion can lead to a certain degree of mixing. A finite width of the interface can therefore be expected, which can then lead to a gradual transition from the low shear rheology to the high shear rheology, shown by the dotted lines in FIGS. 2 and 3. Furthermore, a real rheology could combine both signatures, and as a result, a three-dimensional structure can be likely in an embodiment.

As mentioned, a layered structure can appear when slurry is being transported with a shear thinning non-monotonic rheological fluid. Introduction of particles does not necessarily disrupt the layered structure that can form with clean fluid alone. Instead, particles can follow the layered pattern, traveling in the layers characterized by the low shear rate rheology in one embodiment. The thickness of the layers can thus be a function of particle size and concentration as well. Consequently, in an embodiment, the existence of particles can modify the low shear rate rheology and have little impact on the high shear rate rheology. A map of a general non-monotonic shear thinning rheology as a function of the flow field can be predicted when the layered structure occurs, based on the critical shear stresses and rates associated with the shear induced phase transition.

With reference to the nomenclature of FIG. 1, in a hydraulic fracturing treatment, the criterion for the layered structure to occur can be expressed as $\sigma|_{inlet} \geq \sigma_1$ where $\sigma|_{inlet}$ is the shear stress at the inlet to the fracture and $\sigma_1$ is the critical shear stress as shown in the flow curve of FIG. 1. The reason the critical shear stress should be $\sigma_1$ instead of $\sigma_2$ is that the fracturing propagation process is in essence an unloading process; at a fixed spatial point, the shear stress decreases with time. Therefore, the governing rheology at this particular point evolves from high shear rate dominance to low shear rate dominance.

In a hydraulic fracturing treatment, the criterion discussed above translates into a condition for a minimum pump rate, $Q_{min}$. The minimum pump rate can be obtained from an iterative process for an arbitrary pump schedule using a fracturing simulator such as, for example, the hydraulic fracturing design and evaluation engineering application available from Schlumberger Oilfield Services under the trade designation FRACCADE, which is available in an integrated suite of engineering applications for well construction, production and intervention under the trade designation CADE OFFICE.

Figure 4:
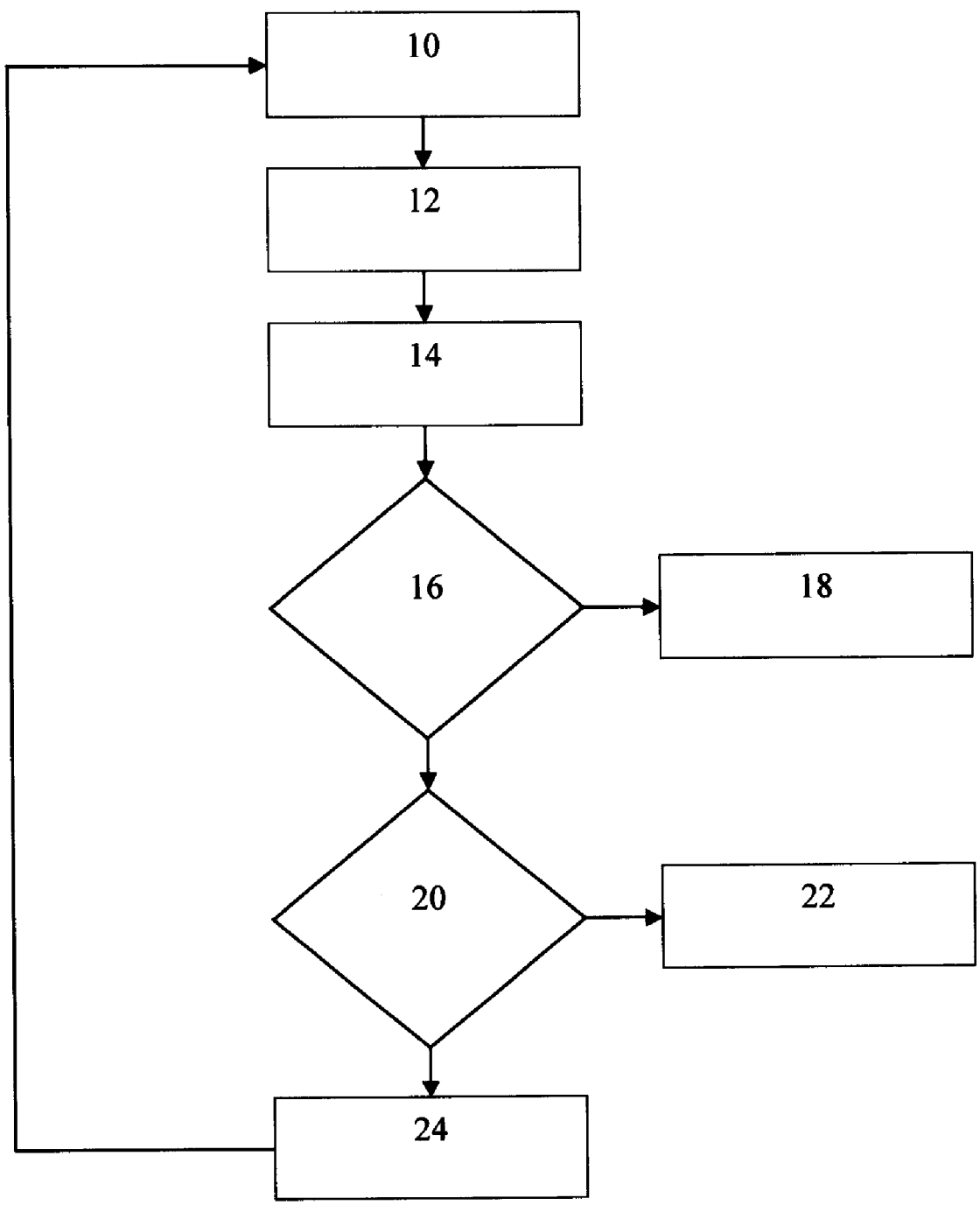
FIG. 4 is a schematic flow chart illustrating an iterative process to obtain a minimum pump rate for hydraulic fracturing according to an embodiment of the invention.

FIG. 4 is a schematic flow chart illustrating an iterative process to obtain a minimum pump rate for hydraulic fracturing according to an embodiment of the invention. In FIG. 4, Q is the pump rate, $\epsilon$ is the tolerance, $Q^{old}$ is an initial or former pump rate and $Q^{new}$ is a newly calculated pump rate. An initial Q and pump schedule can be entered in step 10. Based on the initial Q and pump schedule, the fracture inlet width, w, bottom hole pressure, p, and fracture inlet pressure gradient, dp/dx, at the end of pumping can be determined in step 12. The shear stress at the inlet, $\sigma|_{inlet}$, can be determined in step 14 by the equation $$\sigma|_{inlet} = -\frac{dp}{dx}w,$$

and can be compared in step 16 with the upper boundary of the critical shear, $\sigma_2$. If $\sigma|_{inlet}$ is greater than $\sigma_2$ ($\sigma|_{inlet}>\sigma_2$), then Q is above the required minimum and can be deemed acceptable in step 18. If $\sigma|_{inlet}$ is not greater than $\sigma_2$, then the value of $\sigma_2$ minus $\sigma|_{inlet}$ is compared in step 20 with the tolerance, $\epsilon$. If the value of $\sigma_2$ minus $\sigma|_{inlet}$ is less than or equal to $\epsilon$ ($\sigma_2-\sigma|_{inlet}\leq\epsilon$), then the initial or former pump rate, $Q^{old}$, is found to be equal to the minimum pump rate ($Q_{min}=Q^{old}$) in step 22. If the value of $\sigma_2$ minus $\sigma|_{inlet}$ is not less than or equal to $\epsilon$, then Q is increased incrementally in step 24 such that the newly calculated pump rate, $Q^{new}$, is equal to $Q^{old}$ plus the incremental increase, $\Delta Q$ ($Q^{new}=Q^{old}+\Delta Q$). $Q^{new}$ is then input as an updated Q in step 10, and the process is repeated in steps 12, 14 and so on with the updated Q.

FIG. 4 is one illustrative example of a simple design process, and does not limit design treatments that can benefit from the non-monotonic fluid rheology behavior according to embodiments. High shear rate rheology can be used as the input fluid rheology. Explicit expressions can be obtained if analytic solutions exist for a given geometry model. However, the optimum pump rate would depend on the particular fluid characteristics and could be determined through experimental work.

Figure 5:
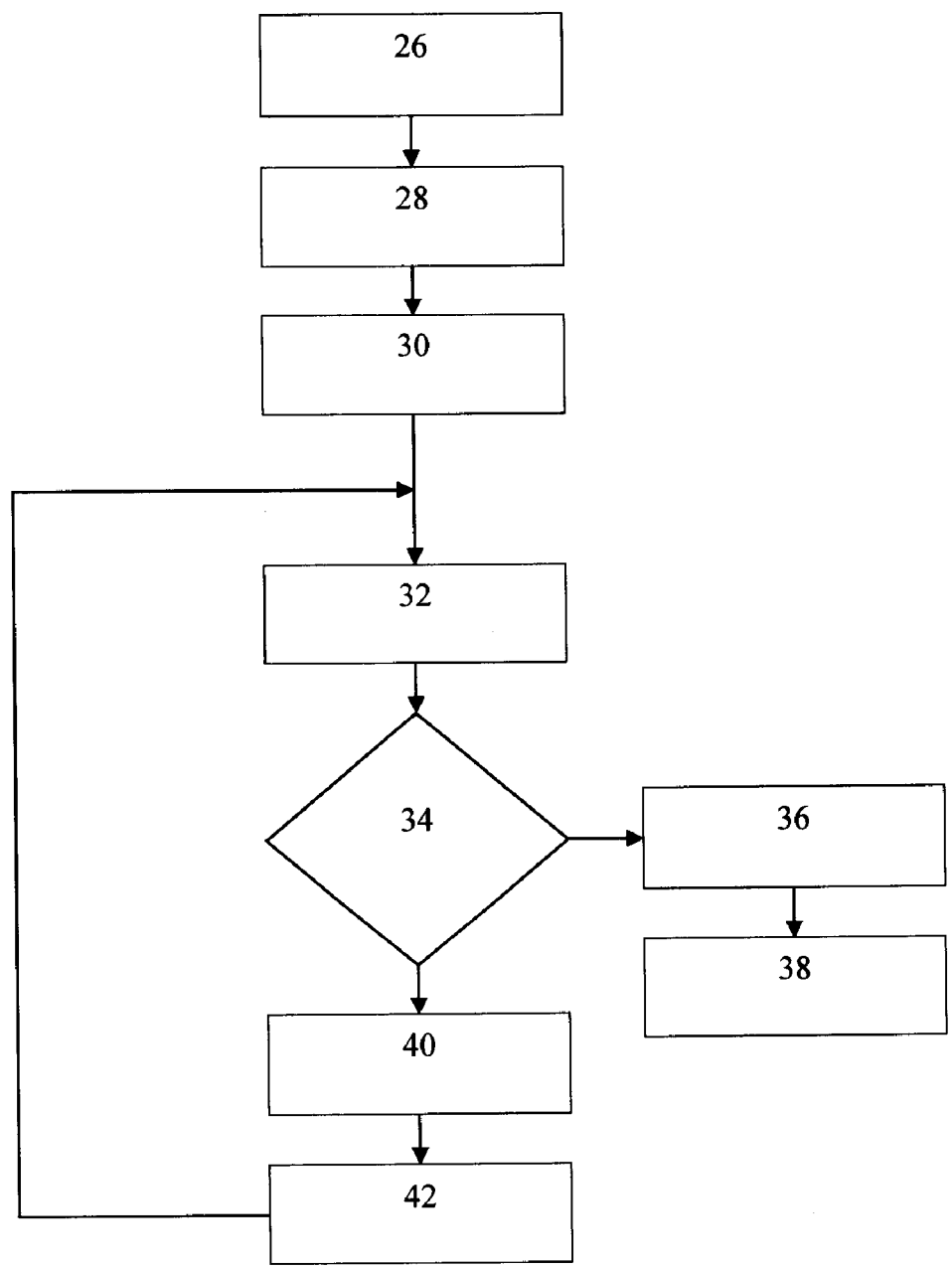
FIG. 5 is a schematic flow chart illustrating a sequence of steps for fracturing a subterranean formation according to an embodiment of the invention.

FIG. 5 is a schematic flow chart illustrating a sequence of steps for fracturing a subterranean formation according to an embodiment of the invention. A treatment fluid with shear thinning, non-monotonic rheological properties can be prepared in step 26. A pumping schedule can be developed in step 28 using a fracturing simulator to maintain at least the minimum pumping rate during injection of the treatment fluid into a subterranean formation. The treatment fluid can be pumped into the wellbore according to the schedule in step 30 to fracture the subterranean formation. Shear rate softening phase transition in the treatment fluid can be induced in step 32. If the treatment is complete in step 34, then the pumping can be stopped and the fracture allowed to close in step 36 and a layered structure can be maintained in the fracture to form permeable channels in the fracture in step 38. If the treatment is not complete in step 34, then a loop can be followed wherein the pump schedule can be revised in step 40, the treatment fluid can be pumped according to the revised schedule in step 42 and the process returned to the step 32 inducement of the shear rate softening phase transition.

Treatment fluids in an embodiment can include an aqueous medium which can include, for example, produced water, fresh water, seawater, brine or a combination thereof. In embodiments in which the aqueous medium includes brine, the brine can be, for example, water including an inorganic salt, organic salt or a combination thereof. Suitable inorganic salts can include alkali metal halides such as potassium chloride. The brine phase can include an organic salt such as sodium or potassium formate, or sodium or potassium salicylate. Suitable inorganic divalent salts can include calcium halides such as calcium chloride, calcium bromide or a combination thereof. Sodium bromide, potassium bromide, or cesium bromide can be used, either alone or in combination. The salt can be chosen for compatibility reasons. For example, the reservoir drilling fluid used a particular brine phase, the completion/clean up fluid brine phase can be chosen to have the same brine phase.

Fluids useful in embodiments can include one or more viscosifying agents that obtain the non-monotonic fluid rheology with shear thinning in the desired stress-strain region for the subterranean treatment. Examples of agents that impart non-monotonic rheology include a system of (Z)-13 docosenyl-N-N-bis (2-hydroxyethyl) methyl ammonium chloride and salicylic acid, a system of AOT (sodium bis(2-ethylhexyl) sulfosuccinate) in brine, and the like. Other suitable alternative and/or additional viscosifying agents can be, for example, a polymer that is either crosslinked or linear, a viscoelastic surfactant, clay such as Bentonite and attapulgite, or any combination thereof. For hydraulic fracturing, gravel packing, or a combination thereof, aqueous fluids for pads or for forming slurries are generally viscosified. Viscoelastic surfactants (VESs) can form appropriately sized and shaped micelles that can add viscosity to aqueous fluids. Small amounts of polymers can be used to increase the viscosity or for other purposes such as, for example, to reduce friction. Breakers can be used with VESs.

Examples of suitable polymers for use as viscosifying agents in the fluids, and/or used according to some embodiments of the invention include, but are not limited to, guar gums, high-molecular weight polysaccharides composed of mannose and galactose sugars, or guar derivatives such as hydroxypropyl guar (HPG), carboxymethyl guar (CMG), carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) can be used in either crosslinked form, or without crosslinker in linear form. Xanthan, diutan, and scleroglucan, three biopolymers, have been shown to be useful as viscosifying agents. Polyacrylamide and polyacrylate polymers and copolymers are used typically for high-temperature applications. Of these viscosifying agents, guar, hydroxypropyl guar and carboxymethlyhydroxyethyl guar are commonly used. In many instances, the polymeric viscosifying agent can be crosslinked with a suitable crosslinker. Suitable crosslinkers for the polymeric viscosifying agents can include a chemical compound containing an ion such as, but not necessarily limited to, chromium, iron, boron, titanium, and zirconium. The borate ion is a particularly suitable crosslinking agent. When polymers are incorporated into fluids used in embodiments of the invention, the amount of polymer can range from about 0.01% to about 1.00%, and preferably from about 0.10% to about 0.60%, and more preferably from about 0.10% to about 0.40% by weight of total fluid weight.

A VES can be used in fluids of some embodiments of the invention, as a viscosifying agent. The VES can be, for example, selected from the group consisting of cationic, anionic, zwitterionic, amphoteric, nonionic and combinations thereof, such as those cited in U.S. Pat. No. 6,435,277 (Qu et al.) and U.S. Pat. No. 6,703,352 (Dahayanake et al.). The surfactants, when used alone or in combination, can form micelles (sometimes referred to as "viscosifying micelles") that form a structure in an aqueous environment that contributes to the increased viscosity of the fluid. These fluids can be prepared by mixing in appropriate amounts of VES suitable to achieve the desired viscosity. The viscosity of VES fluids can be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into fluids used in embodiments of the invention, the VES can range from about 0.2% to about 15% by weight of total weight of fluid, preferably from about 0.5% to about 15% by weight of total weight of fluid, more preferably from about 0.5% to about 15% by weight of total weight of fluid. A particularly useful VES is Erucyl bis-(2-Hydroxyethyl) Methyl Ammonium Chloride.

Friction reducers can be incorporated into fluids used in embodiments. Any friction reducer can be used. Polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide can be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" can be effective. These polymeric species added as friction reducers or viscosity index improvers can act as excellent fluid loss additives reducing or even eliminating the need for conventional fluid loss additives.

Embodiments can include a breaker used in the fluid. The purpose of this component is to "break" or diminish the viscosity of the fluid so that this fluid is more easily recovered from the formation during cleanup. With regard to breaking down viscosity, oxidizers, enzymes, or acids can be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion can exist and be available to crosslink and cause gelling. At lower pH, the borate can be tied up by hydrogen and not be available for crosslinking, thus gelation caused by borate ion can be reversible.

Fluids useful in method embodiments can include proppant particles, or solid particles, that are substantially insoluble in the fluids of the formation. Proppant particles carried by the treatment fluid can remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials can be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation processing, etc. Further information on nuts and composition thereof can be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981.

The solid particles, or proppants, can be particles that hydrolyze under known and controllable conditions of temperature, time and pH to evolve the organic acid precursors. Any acid particle which is prone to such hydrolysis can be used in embodiments. One example of a suitable acid particle is a solid polyacid formed from the solid cyclic dimer of lactic acid (known as "lactide"), which has a melting point of 95 to 125° C., (depending upon the optical activity). Another is a polymer of lactic acid, sometimes called a polylactic acid ("PLA"), or a polylactate, or a polylactide. Another example is the solid cyclic dimer of glycolic acid (known as "glycolide"), which has a melting point of about 86° C. Yet other examples suitable as solid acid-precursors are those polymers of hydroxyacetic acid, such as polyglycolic acid ("PGA"), with itself or other hydroxy-, carboxylic acid-, or hydroxycarboxylic acid-containing moieties described in U.S. Pat. Nos. 4,848,467; 4,957,165; and 4,986,355. Another example is a copolymer of lactic acid and glycolic acid. These polymers and copolymers are polyesters. A particular advantage of these materials is that the solid polyacids and the generated acids are non-toxic and are biodegradable. The solid polyacids are often used as self-dissolving sutures.

The concentration of solid particle, or proppant, in the fluid can be any concentration known in the art, and will preferably be in the range of from about 0.05 to about 3 kilograms of proppant added per liter of liquid phase. Any of the proppant particles can further be coated with a resin to potentially improve the strength, clustering ability, and flow back properties of the proppant.

A fiber component can be included in the fluids to achieve a variety of properties including improving particle suspension, and particle transport capabilities, and gas phase stability. Fibers used can be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers or a mixture thereof. Particularly useful fibers are polyester fibers which are coated to enhance their hydrophilic properties, such as, but not limited to, the polyethylene terephthalate (PET) fibers available from Invista Corp. under the trade designation DACRON. Other examples of useful fibers include, but are not limited to, polylactic acid polyester fibers, polyglycolic acid polyester fibers, polyvinyl alcohol fibers, and the like. When used in the fluids of embodiments, the fiber component can be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid Fluids used in method embodiments of the invention can further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, organic solvents, scale inhibitors, corrosion inhibitors, fluid-loss additives, bactericides, biocides, and the like. They can include a co-surfactant to optimize viscosity or to minimize the formation of stable emulsions that contain components of crude oil or at least one additional polysaccharide polymer including 1,2-cis hydroxyls or chemically modified polysaccharide polymer including 1,2-cis hydroxyls, such as cellulose, derivatized cellulose, guar gum, derivatized guar gum, xanthan gum, or synthetic polymers such as polyacrylamides and polyacrylamide copolymers. The fluids used in embodiments can contain a ligand such as a polyol including 1,2-cis hydroxyls (glycerol, sorbitol, gluconic acid salts, mannitol, and the like, by non limiting example), oxygen scavengers such as sodium thiosulfate or even oxidizers such as ammonium persulfate, peroxides, and sodium bromate.

When organic solvents are incorporated into fluids, any suitable solvent can be used. A plurality of solvents can be incorporated. Examples of suitable solvents include hydrocarbons, such as mineral oil, oxygenated solvents, such as glycol ethers, alcohols, ethers, ketones, esters, biodiesel, oxygenated/hydrocarbon solvent mixtures, and the like. Organic solvents are typically incorporated in an amount from about 0.05% to about 70% by weight based on total liquid phase weight, preferably from about 0.1% to about 35% by weight based on total liquid phase weight.

EXAMPLES

Figure 6:
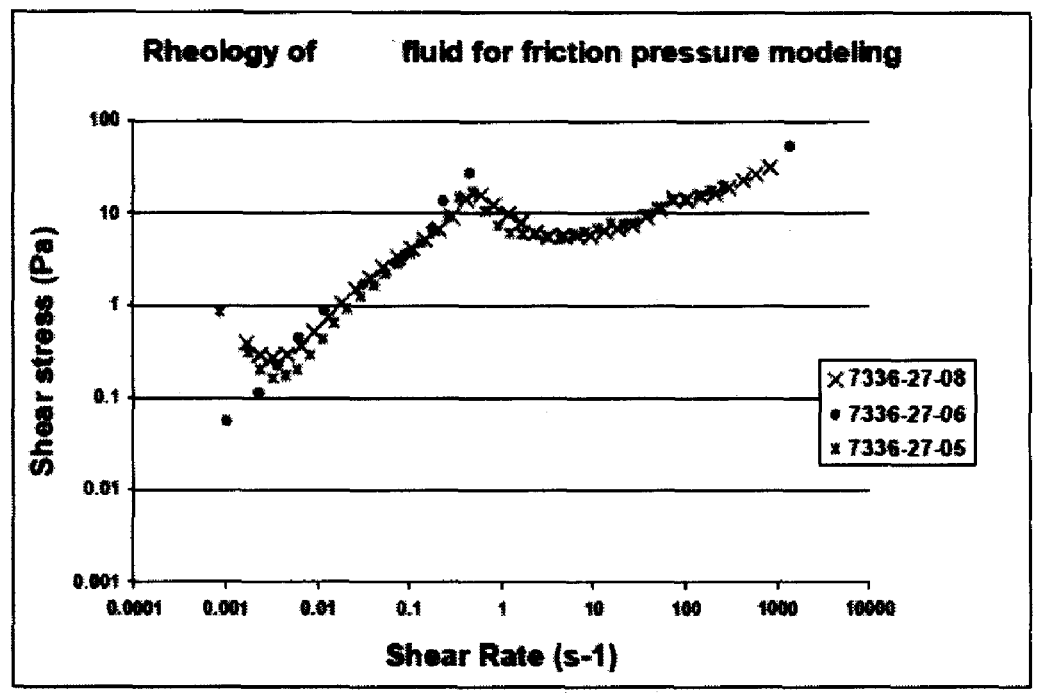
FIG. 6 schematically illustrates the stress-strain flow curve for a non-monotonic shear thinning rheology for an exemplary fluid of 3 wt % aqueous (Z)-13-docosenyl-N-N-bis-(2-hydroxyethyl) methyl ammonium chloride and 35 pounds sodium salicylate per 1000 gallons fluid, wherein the solid circles denote the results obtained from stress-controlled tests in a Couette cell and the rest are from rate-controlled tests.

FIG. 6 shows an example of the flow curve for an aqueous fluid including 3% by weight (Z)-13-docosenyl-N-N-bis-(2-hydroxyethyl) methyl ammonium chloride, based upon total fluid weight, and 35 pounds of sodium salicylate per 1000 gallons of fluid. These measurements were performed on a Bohlin CVO-120 rheometer using a C25 Couette geometry (cup diameter=27 mm, bob diameter=25 mm). Measurements were performed in both a controlled rate mode and a controlled stress mode. The rate softening characteristics were only captured in the controlled rate mode. FIG. 6 shows a flow curve exemplary of a fluid with non-monotonic behavior, wherein the solid circles denote the results obtained from stress-controlled tests in a Couette cell, and the other points on the flow curve are from rate-controlled tests. As shown in the flow curve of FIG. 6, with a fluid with rheology that shows non-monotonic behavior, the shear stress can decrease with increasing shear rate.

Experimental evidence was obtained from slot flow tests with fluids with non-monotonic rheological behavior. When a proppant slurry, in the aqueous fluid of (Z)-13-docosenyl-N-N-bis-(2-hydroxyethyl) methyl ammonium chloride and sodium salicylate with the flow curve of FIG. 1, was pumped into a slot with a shear rate and shear stress in the shear thinning region of the flow curve, a layered structure formed in the height direction, i.e., parallel to the flow direction.

Clean fluid was seen in between proppant laden layers above the deposition bed; a clean fluid was located in highly conductive paths.

A complex layered three-dimensional structure was also obtained in a test tube when an aqueous fluid, including (Z)-13-docosenyl-N-N-bis-(2-hydroxyethyl) methyl ammonium chloride and having non-monotonic rheology, was subjected to oscillatory shear imposed by hand. The fluid was originally transparent. After being sheared, cloudy layers appeared periodically in the vertical direction. In the radial cross-section, a cloudy core was observed. The structure demonstrated permanency in that it would return to the original transparent state only after being shaken destructively. The structure formed again when sheared.

Figure 7:
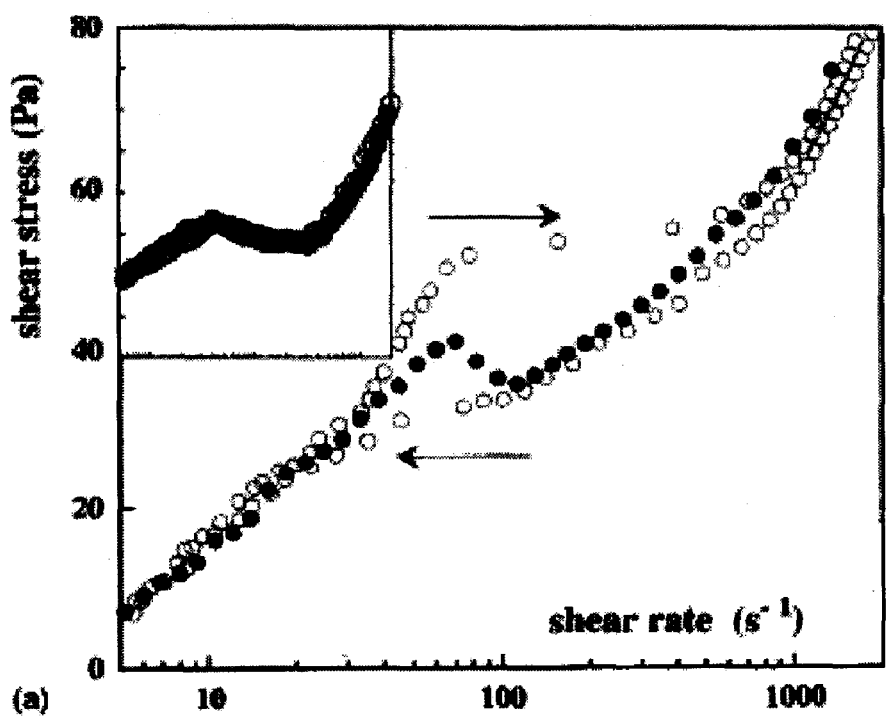
FIG. 7 schematically illustrates the stress-strain flow curve for a non-monotonic shear thinning rheology for an exemplary fluid of aqueous sodium bis(2-ethylhexyl) sulfosuccinate and 0.5 wt % NaCl, wherein filled circles indicate results obtained from rate-controlled measurement and open circles for stress-controlled tests, and wherein the inset shows rate-controlled measurements obtained from two different samples prepared independently with 0.7 wt % NaCl.

FIG. 7 shows an example of the flow curve showing non-monotonic behavior with aqueous solutions of 7 weight percent sodium bis(2-ethylhexyl) sulfosuccinate (AOT) with 0.5 weight percent NaCl; filled circles indicate results obtained from rate-controlled measurement and open circles for stress-controlled tests. The FIG. 7 inset shows rate-controlled measurements obtained from two different samples prepared independently with 0.7 weight percent salt on the same scale.

An aqueous solution of 7 weight percent sodium bis(2-ethylhexyl) sulfosuccinate (AOT) with 1.2 weight percent NaCl, was sheared in a transparent Couette cell at a constant rate of 200 l/s. The vertical direction is the height direction of the Couette cell. The height direction of a Couette cell, a test tube, or a slot is the vorticity direction, i.e., the direction perpendicular to the plane of shear. The fluid formed a layered structure in the height direction with visible shear bands.

The particular embodiments disclosed above are illustrative only, as the invention can be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above can be altered or modified and all such variations are considered within the scope and spirit of the invention. Accordingly, the protection sought herein is as set forth in the claims below.

All patents and publications referred to herein, and references cited therein, are hereby incorporated by reference in their entireties to the extent they are not inconsistent with the present invention and to the extent permitted under the patent practice rules of the US and other jurisdictions.

What is claimed is:

1. A method of treating a subterranean formation penetrated by a wellbore, comprising:
   preparing a treatment fluid with shear thinning, non-monotonic rheological properties,
      wherein the treatment fluid comprises a slurry of entrained particles distributed during the phase transition into a layered structure comprising particle-rich layers alternated with particle-lean layers, and
      wherein the non-monotonic rheological properties comprise a shear rate softening relationship between shear stress ($\sigma$) versus strain rate ($\dot{\gamma}$) wherein for $\dot{\gamma}_1 < \dot{\gamma}_2 < \dot{\gamma}_3 < \dot{\gamma}_4$, corresponding values of shear stress are $\sigma_1 < \sigma_2$, $\sigma_2 > \sigma_3$, and $\sigma_3 \leq \sigma_4$, wherein $\dot{\gamma}_1$, $\sigma_1$ represent a region of low shear rate dominance, $\dot{\gamma}_4$, $\sigma_4$ represent a region of high shear rate dominance and $\dot{\gamma}_2$, $\sigma_2$ and $\dot{\gamma}_3$, $\sigma_3$ represent a shear rate softening transition region;
   injecting the treatment fluid into the subterranean formation;
   inducing shear rate softening phase transition in the treatment fluid; and
   fracturing the subterranean formation and maintaining the layered structure in a fracture after closure of the fracture to form permeable channels in the fracture.

2. The method of claim 1 wherein the particles comprise proppant and the permeable channels are formed in a proppant pack.

3. The method of claim 1 wherein the particles comprise solid acid and the permeable channels are formed by etching ridges and valleys in a surface of the fracture.

4. The method of claim 1 wherein the injection comprises a pumping rate at an inlet to the fracture to provide a shear stress at the inlet that exceeds a minimum critical shear rate in a region of high shear rate dominance adjacent a shear rate softening transition region.

5. The method of claim 4 wherein propagation of the fracture comprises an unloading process wherein shear stress at a fixed point decreases with time.

6. The method of claim 1, wherein the injection comprises a minimum pumping rate at an inlet to a fracture in the formation to provide a shear stress at the inlet that exceeds $\sigma_2$.

7. The method of claim 6 further comprising developing a pumping schedule using a fracturing simulator to maintain at least the minimum pumping rate during the injection, and pumping the fracturing fluid into the wellbore according to the schedule.

8. The method of claim 7 further comprising revising the pumping schedule during the injection and pumping the fracturing fluid according to the revised schedule.

9. A method of fracturing a subterranean formation penetrated by a wellbore, comprising:
   developing a pumping schedule for injection of a fracturing fluid with shear thinning, non-monotonic rheological properties at a pumping rate to propagate a fracture in the subterranean formation and to induce shear rate softening phase transition in the fracturing fluid during the propagation of the fracture;
   wherein the non-monotonic rheological properties comprise a shear rate softening relationship between shear stress ($\sigma$) versus strain rate ($\dot{\gamma}$) wherein for $\dot{\gamma}_1 < \dot{\gamma}_2 < \dot{\gamma}_3 < \dot{\gamma}_4$, corresponding values of shear stress are $\sigma_1 < \sigma_2$, $\sigma_2 > \sigma_3$, and $\sigma_3 \leq \sigma_4$, wherein $\dot{\gamma}_1$, $\sigma_1$ represent a region of low shear rate dominance, $\dot{\gamma}_4$, $\sigma_4$ represent a region of high shear rate dominance and $\dot{\gamma}_2$, $\sigma_2$ and $\dot{\gamma}_3$, $\sigma_3$ represent a shear rate softening transition region;
   wherein the injection comprises a minimum pumping rate at an inlet to a fracture in the formation to provide a shear stress at the inlet that exceeds $\sigma_2$;
   injecting the fracturing fluid via the wellbore and the inlet into the subterranean formation; and
   wherein the fracturing fluid comprises a slurry of entrained particles distributed during the phase transition into a layered structure comprising particle-rich layers alternated with particle-lean layers;
   stopping the pumping and allowing the fracture to close;
   maintaining the layered structure after fracture closure to form permeable channels in the fracture.

10. The method of claim 9 wherein the particles comprise proppant and the permeable channels are formed in a proppant pack.

11. The method of claim 9 wherein the particles comprise solid acid and the permeable channels are formed by etching ridges and valleys in a surface of the fracture.

12. The method of claim 9 further comprising developing the pumping schedule using a fracturing simulator, revising the pumping schedule during the injection and pumping the fracturing fluid according to the revised schedule.

13. A system to fracture a subterranean formation, comprising:
- a fracturing fluid with shear thinning, non-monotonic rheological properties and comprising a slurry of particles in an aqueous medium with a viscosifying agent;
- wherein the non-monotonic rheological properties comprise a shear rate softening relationship between shear stress ($\sigma$) versus strain rate ($\dot\gamma$) wherein for $\dot\gamma_1<\dot\gamma_2<\dot\gamma_3<\dot\gamma_4$, corresponding values of shear stress are $\sigma_1<\sigma_2$, $\sigma_2>\sigma_3$, and $\sigma_3\leq\sigma_4$, wherein $\dot\gamma_1$, $\sigma_1$ represent a region of low shear rate dominance, $\dot\gamma_4$, $\gamma_4$ represent a region of high shear rate dominance and $\dot\gamma_2$, $\sigma_2$ and $\dot\gamma_3$, $\sigma_3$ represent a shear rate softening transition region;
- a wellbore penetrating and in fluid communication with the formation to inject the fracturing fluid to propagate a fracture in the formation; and
- a rate controller to inject the fracturing fluid into the subterranean formation at a minimum volumetric rate to provide a shear stress at an inlet to the fracture that exceeds $\sigma_2$.

14. The system of claim 13 wherein the particles comprise proppant.

15. The system of claim 13 wherein the particles comprise solid acid.

16. The system of claim 15 wherein the viscosifying agent comprises from 0.5% to 15% by weight of the fluid of a viscoelastic surfactant, based on the total fluid weight at injection.

17. The system of claim 16 wherein the viscoelastic surfactant comprises erucyl bis-(2-hydroxyethyl) methyl ammonium chloride.

18. The system of claim 13 wherein the aqueous medium comprises brine containing potassium chloride, sodium formate, potassium formate, calcium chloride, calcium bromide or a combination thereof.

19. The system of claim 13 wherein the viscosifying agent comprises from 0.10% to about 0.60% by weight of the fluid of a polymer, based on the total fluid weight at injection.

20. The system of claim 19 wherein the polymer is selected from the group consisting of hydroxypropyl guar (HPG), carboxymethyl guar (CMG), carboxymethylhydroxypropyl guar (CMHPG), hydroxyethylcellulose (HEC), hydroxypropylcellulose (HPC), carboxymethylhydroxyethylcellulose (CMHEC), xanthan, diutan, scleroglucan, polyacrylamide polymers, polyacrylate polymers, or any mixtures thereof.

* * * * *